(12) United States Patent
Durali et al.

(10) Patent No.: US 12,454,895 B2
(45) Date of Patent: Oct. 28, 2025

(54) TESTING MECHANICAL OVERSPEED PROTECTION SYSTEMS

(71) Applicants: Mohammad Durali, Tehran (IR); Mohammad Hossein Heydari, Tehran (IR); Amir Mahdi Soufi Enayati, Tehran (IR); Seyed Mahdi Hosseini, Tehran (IR)

(72) Inventors: Mohammad Durali, Tehran (IR); Mohammad Hossein Heydari, Tehran (IR); Amir Mahdi Soufi Enayati, Tehran (IR); Seyed Mahdi Hosseini, Tehran (IR)

( * ) Notice: Subject to any disclaimer, the term of this patent is extended or adjusted under 35 U.S.C. 154(b) by 308 days.

(21) Appl. No.: 18/346,825

(22) Filed: Jul. 4, 2023

(65) Prior Publication Data

US 2024/0003264 A1     Jan. 4, 2024

Related U.S. Application Data

(63) Continuation-in-part of application No. PCT/IB2021/060779, filed on Nov. 20, 2021.
(Continued)

(51) Int. Cl.
*G01M 99/00*     (2011.01)
*F01D 21/00*     (2006.01)
*F01D 21/02*     (2006.01)

(52) U.S. Cl.
CPC .......... *F01D 21/003* (2013.01); *F01D 21/02* (2013.01); *F05D 2260/12* (2013.01); *F05D 2270/021* (2013.01); *F05D 2270/802* (2013.01)

(58) Field of Classification Search
CPC .......... F01D 5/26; F01D 21/00; F01D 21/003; F01D 21/02; F01D 21/12; F05D 2260/12; F05D 2260/96; F05D 2270/021; F05D 2270/802; F05D 2270/80; G01M 15/14; G01M 99/00
See application file for complete search history.

(56) References Cited

U.S. PATENT DOCUMENTS

| | | | |
|---|---|---|---|
| 9,366,236 B2 * | 6/2016 | Holzweber | ............ F03D 17/00 |
| 2020/0240288 A1 * | 7/2020 | Rasheed | ................. F01D 21/16 |
| 2024/0003264 A1 * | 1/2024 | Durali | .................... F01D 21/02 |

FOREIGN PATENT DOCUMENTS

| CN | 109552960 A | * | 4/2019 | ............ G01M 13/00 |
|---|---|---|---|---|
| CN | 109696303 A | * | 4/2019 | .............. G01M 7/02 |

(Continued)

*Primary Examiner* — Alexander A Mercado (57) ABSTRACT

A system for calibrating the trip speed of a mechanical overspeed sensing device by manipulating the compression of a spring of the overspeed sensing device. The system may include a rotatable annular mount, on which the mechanical overspeed sensing device is mounted and a trip sensor. The system may drive a rotational movement of the annular mount with a varying speed over time during a test run. The system may designate a rotational speed of the annular device at which the trip sensor is struck by the mechanical overspeed sensing device as a measure trip speed. The measured trip speeds may be determined for various compressions of the spring of an exemplary mechanical overspeed sensing device and based on a desired tripping speed received from a user, a compression value of the spring may be selected for which the closest measured tripping speed to the desired tripping speed is obtained.

12 Claims, 9 Drawing Sheets

Related U.S. Application Data

(60) Provisional application No. 63/133,435, filed on Jan. 4, 2021.

(56) References Cited

FOREIGN PATENT DOCUMENTS

| | | | | | |
|---|---|---|---|---|---|
| CN | 112082743 | A | * | 12/2020 | ............ G01M 13/00 |
| CN | 113074963 | A | * | 7/2021 | ............ G01M 17/02 |
| CN | 115127802 | A | * | 9/2022 | .......... G01M 13/003 |
| CN | 118549165 | A | * | 8/2024 | .......... G01M 99/008 |

\* cited by examiner

TESTING MECHANICAL OVERSPEED PROTECTION SYSTEMS

CROSS-REFERENCE TO RELATED APPLICATION

This application is a continuation-in part of International Application No. PCT/IB2021/060779, filed Nov. 20, 2021, and entitled "TESTING MECHANICAL OVERSPEED PROTECTION SYSTEMS" which claims the benefit of priority from U.S. Provisional Patent Application Ser. No. 63/133,435, filed on Jan. 4, 2021, and entitled "MULTI-PURPOSE HYDRO POWER PLANT MECHANICAL OVER-SPEED DEVICE TESTER" which are both incorporated herein by reference in their entirety.

TECHNICAL FIELD

The present disclosure relates to turbine overspeed protection systems, particularly to mechanical overspeed protection systems. More particularly, the present disclosure is directed to a system and method for testing and calibrating mechanical overspeed sensing devices.

BACKGROUND

One of the most alarming industrial accidents is an overspeed failure on steam turbines. An overspeed failure may occur when the rotational speed of a turbine exceeds the safe operating limits of the turbine. The centrifugal force exerted on the main shaft and impeller of a turbine due to over-speeding of the turbine, may tear apart the turbine. A turbine overspeed accident may be very costly and may even include lives lost. Poor component design, inadequate maintenance, inappropriate operating practices, and accidents, such as power surge due to lightening may be considered as main causes for a destructive overspeed failure. Even in milder episodes of an overspeed failure, vibrations and exceeding the allowable velocity limit of the generator may increase the risk of power outages and production lost.

Multi-layer protection systems have been designed and utilized to address the problems associated with an overspeed failure and to increase system reliability. A mechanical overspeed protection system may be considered as the last layer of such multi-layer protection systems. Some mechanical overspeed sensing mechanisms that may be utilized in a mechanical overspeed protection system may include pivoted lever weight, pin type weight, eccentric ring mechanism, and dished disk.

Generally, a mechanical overspeed protection system may be designed to sense when a turbine's shaft speed reaches a predetermined speed limit and then activate a shutdown system to protect the turbine from damage. For example, a simple mechanical overspeed protection system may include a mechanical device mounted on the turbine rotor that may move in response to the rotor reaching a speed limit. The mechanical device may include a weight coupled to a spring, where in response to a rotor exceeding its safe speed limit, the weight may extend under the influence of centrifugal force and may strike a trigger mechanism that may be linked to a shut off system. The operation of such mechanical overspeed protection system may rely on a balance between the spring force and a centrifugal force exerted on the weight due to the rotation of a turbine's shaft. In response to the rotational speed of the turbine shaft exceeding its safe operating limits, the centrifugal force may overcome the spring force and the weight may extend and physically contact a lever of the trigger mechanism that may activate the shut off system.

A mechanical overspeed protection system needs to be tested occasionally to verify proper operation of the system, as well as measuring the system response time. One approach to test mechanical overspeed protection systems is to perform the tests while the overspeed protection system is in service within a hydropower unit under actual operational conditions. However due to the risk of damaging the expensive equipment of a hydropower unit and the limited number of operating conditions that can be tested, there is a need for a testing system and method that may allow for performing such tests under laboratory conditions.

SUMMARY

This summary is intended to provide an overview of the subject matter of the present disclosure and is not intended to identify essential elements or key elements of the subject matter, nor is it intended to be used to determine the scope of the claimed implementations. The proper scope of the present disclosure may be ascertained from the claims set forth below in view of the detailed description and the drawings.

According to one or more exemplary embodiments, the present disclosure is directed to a system for testing a mechanical overspeed sensing device. An exemplary system may include a main chassis, an annular support mounted on an exemplary main chassis. An exemplary annular support may be configured to allow for an exemplary mechanical overspeed sensing device to be mounted on an exemplary annular support. An exemplary mechanical overspeed sensing device may include a spring-loaded trip weight with a predetermined spring tension.

An exemplary system may further include a motor that may be coupled to an exemplary annular support. An exemplary motor may be configured to drive a rotational movement of an exemplary annular support. An exemplary system may further include a rotational speed sensor that may be coupled to an exemplary annular support. An exemplary rotational speed sensor may be configured to generate output signals indicative of rotational speed of an exemplary annular support at any given instance during a test interval. An exemplary system may further include a trip sensor that may be coupled to an exemplary mechanical overspeed sensing device. An exemplary trip sensor may be configured to generate an output signal responsive to an exemplary trip sensor being struck by an exemplary spring-loaded trip weight.

An exemplary system may further include a control unit coupled to an exemplary motor, an exemplary rotational speed sensor, and an exemplary trip sensor. An exemplary control unit may include at least one processor and at least one non-transitory memory that may be coupled to an exemplary processor. At least one exemplary non-transitory memory may be configured to store executable instructions to urge at least one exemplary processor to receive a plurality of test parameters, where plurality of exemplary test parameters may include the spring tension for an exemplary spring-loaded trip weight and speed-over-time data. At least one exemplary non-transitory memory may further be configured to store executable instructions to urge at least one exemplary processor to urge an exemplary motor to drive the rotational movement of an exemplary annular support based on the received speed-over-time data during the test interval, continually receive the output signals from an exemplary rotational speed sensor during the test interval, designating an output signal from an exemplary rotational speed sensor at a given instance as a measured trip speed responsive to receiving the output signal from an exemplary trip sensor at the given instance, and generate a test metric by associating the measured trip speed with the received spring tension.

According to one or more exemplary embodiments, the present disclosure is directed to a method for testing a mechanical overspeed sensing device. An exemplary method may include receiving speed-over-time data, a designated trip speed, and a spring tension of the mechanical overspeed sensing device, urging an exemplary overspeed sensing device to assume a rotational movement of varying speed based on the receive speed-over-time data utilizing a test apparatus.

An exemplary test apparatus may include a main chassis and an annular support that may be mounted on an exemplary main chassis. An exemplary annular support may allow for an exemplary mechanical overspeed sensing device to be mounted on an exemplary annular support. An exemplary mechanical overspeed sensing device may include a spring-loaded trip weight with a predetermined spring tension.

An exemplary test apparatus may further include a motor coupled to an exemplary annular support. An exemplary motor may drive a rotational movement of an exemplary annular support. An exemplary test apparatus may further include a rotational speed sensor that may be coupled to an exemplary annular support. An exemplary rotational speed sensor may generate output signals indicative of rotational speed of an exemplary annular support at any given instance during a test interval. An exemplary test apparatus may further include a trip sensor that may be coupled to an exemplary mechanical overspeed sensing device. An exemplary trip sensor may generate an output signal responsive to an exemplary trip sensor being struck by an exemplary spring-loaded trip weight.

In an exemplary embodiment, urging an exemplary overspeed sensing device to assume a rotational movement of varying speed based on the receive speed-over-time data may include urging an exemplary motor to drive a rotational movement of an exemplary annular support with a varying speed based on the receive speed-over-time data, continually receiving rotational speed readings of an exemplary rotational speed sensor, designating a rotational speed reading of an exemplary rotational speed sensor at a given instance as a measured trip speed responsive to receiving an output signal from an exemplary trip sensor, calculate a speed difference between the measured trip speed and the designated trip speed, and calibrating the trip speed of an exemplary overspeed sensing device by manipulating the spring tension of an exemplary overspeed sensing device.

BRIEF DESCRIPTION OF THE DRAWINGS

The novel features which are believed to be characteristic of the present disclosure, as to its structure, organization, use and method of operation, together with further objectives and advantages thereof, will be better understood from the following drawings in which a presently exemplary embodiment of the present disclosure will now be illustrated by way of example. It is expressly understood, however, that the drawings are for illustration and description only and are not intended as a definition of the limits of the present disclosure. Embodiments of the present disclosure will now be described by way of example in association with the accompanying drawings in which.

DETAILED DESCRIPTION

The novel features which are believed to be characteristic of the present disclosure, as to its structure, organization, use and method of operation, together with further objectives and advantages thereof, will be better understood from the following discussion.

The present disclosure is directed to exemplary embodiments of a system and method for testing mechanical overspeed sensing devices. An exemplary system may be utilized for calibrating the trip speed of a mechanical overspeed sensing device. An exemplary mechanical overspeed sensing device may include a weight that may either be a pivoted lever weight or a pin type weight. An exemplary weight of an exemplary mechanical overspeed sensing device may be attached to a rotating object, such as a turbine shaft by utilizing a spring. An exemplary spring may be configured to have a predetermined compression and limit the movement of an exemplary weight. At trip speed, centrifugal forces cause an exemplary weight to move or pivot into a tripping position, where an exemplary weight may strike a trip lever or sensor associated with an exemplary overspeed sensing device. An exemplary trip speed may be adjusted by changing the compression of an exemplary spring of an exemplary overspeed sensing device.

An exemplary system may be configured to calibrating the trip speed of an exemplary mechanical overspeed sensing device by manipulating the compression of an exemplary spring of an exemplary overspeed sensing device. To this end, an exemplary system and device for testing a mechanical overspeed sensing device may include a rotatable annular mount that may be configured to allow for mounting an exemplary mechanical overspeed sensing device on an exemplary annular mount. An exemplary system and device may further include a rotary actuator, such as an electric motor that may be coupled to an exemplary annular support and may be configured to drive a rotational movement of an exemplary annular mount with a varying speed over time during a test run.

An exemplary system and device may allow for changing the compression of a mechanical overspeed sensing device and then urging an exemplary annular mount to rotate an exemplary mechanical overspeed sensing device at different rotational speed ranging from zero to a maximum allowable rotational speed for an exemplary system and device. An exemplary system may further include a rotational speed sensor that may be configured to measure the rotational speed of an exemplary annular mount at any given instance during the test run. An exemplary system or device may further include a tripping sensor associated with an exemplary mechanical overspeed sensing device and may be tripped by an exemplary overspeed sensing device responsive to the rotational speed of an exemplary annular support exceeding a predetermined speed threshold determined based at least in part on the compression of an exemplary spring of an exemplary mechanical overspeed sensing device.

An exemplary system or device may be configured to designate a rotational speed of an exemplary annular device at which an exemplary trip sensor is struck by an exemplary mechanical overspeed sensing device as a measure trip speed. Exemplary measured trip speeds may be determined for various compressions of an exemplary spring of an exemplary mechanical overspeed sensing device and based on a desired tripping speed received from a user, a compression value of an exemplary spring may be selected for which the closes measure tripping speed to the desired tripping speed is obtained.

Figure 1:
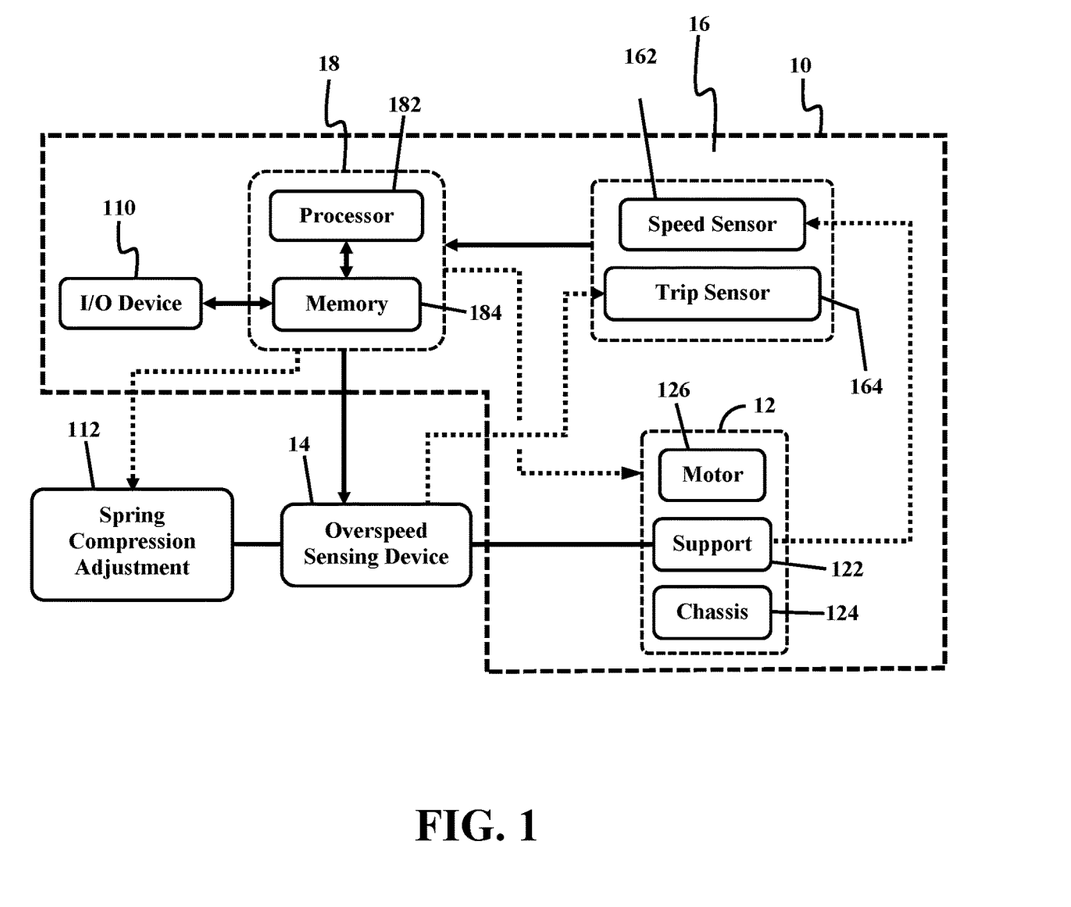
FIG. 1 illustrates a block diagram of a system for testing a mechanical overspeed sensing device, consistent with one or more exemplary embodiments of the present disclosure.

FIG. 1 illustrates a block diagram of a system 10 for testing a mechanical overspeed sensing device 14, consistent with one or more exemplary embodiments of the present disclosure. In an exemplary embodiment, system 10 may include a test apparatus 12 on which mechanical overspeed sensing device 14 may be mounted. In an exemplary embodiment, test apparatus 12 may be configured to simulate a rotating shaft of a turbine, where the rotating shaft may rotate at various speeds and about either horizontal or vertical rotational axes. In an exemplary embodiment, when test apparatus 12 simulates a rotating shaft of a turbine, it may mean that test apparatus may imitate various operating conditions of a rotating shaft of a turbine. In an exemplary embodiment, such configuration of test apparatus 12 may allow for simulating various operating conditions of a turbine shaft and testing a mechanical overspeed sensing device such as mechanical overspeed sensing device 14 under such operating conditions without the need for performing the tests on an actual turbine shaft.

In an exemplary embodiment, test apparatus 12 may include an annular support 122 that may be rotatably mounted on a main chassis 124 of test apparatus 12. In an exemplary embodiment, test apparatus 12 may further include a motor 126 that may be coupled to annular support 122 and may drive a rotational movement of annular support 122 about a central normal axis of annular support 122. As used herein, a central normal axis of an exemplary annular member, such as annular support 122 may refer to an axis perpendicular to an annular surface of an exemplary annular member passing through a center point of the annular surface. In other words, a plane of rotation of annular support 122 may be parallel with the annular surface of annular support 122.

In an exemplary embodiment, mechanical overspeed sensing device 14 may be mounted on annular support 122 and may be rotatable with annular support 122 about the central normal axis of annular support 122. In an exemplary embodiment, mounting mechanical overspeed sensing device 14 on annular support 122 may be functionally and operationally similar to mounting mechanical overspeed sensing device 14 on an exemplary turbine shaft. In an exemplary embodiment, mechanical overspeed sensing device 14 may include a spring-loaded trip weight with a specific spring tension, as will be discussed.

In an exemplary embodiment, system 10 may further include a sensor unit 16 that may include a rotational speed sensor 162 and a trip sensor 164. In an exemplary embodiment, sensor unit 16 may further include other optional sensors that may be required for monitoring the operation of test apparatus 12, such as vibration sensors that may measure vibrations of annular support 122 and main chassis 124. In an exemplary embodiment, a vibration sensor may refer to a piezoelectric accelerometer that may sense vibration. For simplicity, vibration sensors and other optional sensors, such as temperature, humidity, and etc. are not illustrated and labeled in FIG. 1.

In an exemplary embodiment, rotational speed sensor 162 may be coupled to annular support 122 and may be configured to measure rotational speed of annular support 122 at any given instance during a test interval. In an exemplary embodiment, a rotational speed sensor may refer to a sensor that uses various magnetic proximity measuring principles to monitor speed of a component. In an exemplary embodiment, a rotational speed sensor may detect the movement of ferromagnetic structures via the change in the magnetic flux and is biased using a permanent magnet. In other words, rotational speed sensor 162 may be configured to generate output signals indicative of rotational speed of annular support 122 at any given instance during a test interval. In an exemplary embodiment, rotational speed sensor 162 may include at least one of a Hall-Effect sensor and a proximity sensor.

In an exemplary embodiment, trip sensor 164 may be coupled to mechanical overspeed sensing device 14 such that trip sensor 164 may be struck by mechanical overspeed sensing device 14 in response to a rotational speed of annular support 122 exceeding a predetermined speed threshold. In other words, trip sensor 164 may generate an output signal responsive to trip sensor 164 being struck by the spring-loaded trip weight of mechanical overspeed sensing device 14.

In an exemplary embodiment, system 10 may further include a control unit 18 that may be coupled to motor 126, rotational speed sensor 162, and trip sensor 164. In an exemplary embodiment, control unit 18 may be electronically coupled to a driver of motor 126 and may be configured to urge the driver to manipulate the rotational speed of an output shaft of motor 126. In an exemplary embodiment, control unit 18 may further be electronically coupled to rotational speed sensor 162 and trip sensor 164 and may be configured to receive the output signals generated by rotational speed sensor 162 and trip sensor 164. In other words, rotational speed sensor 162 and trip sensor 164 may include transducers that may transmit the output signals of rotational speed sensor 162 and trip sensor 164 to control unit 18. In an exemplary embodiment, control unit 18 may be coupled to motor 126, rotational speed sensor 162, and trip sensor 164 via wired, wireless, or a combination of wired and wireless connections.

In an exemplary embodiment, control unit 18 may include at least one processor 182 and at least one memory 184 that may be coupled to at least one processor 182. In an exemplary embodiment, at least one memory 184 may be configured to store executable instructions to urge at least one processor 182 to perform a plurality of operations. In an exemplary embodiment, the plurality of operations performed by at least one processor 182 may include but are not limited to receiving a plurality of test parameters including the spring tension for spring-loaded trip weight of mechanical overspeed sensing device 14 and a speed over time graph, urging motor 126 to drive the rotational movement of annular support 122 based on the received speed over time graph during a test interval, continually receiving the output signals from rotational speed sensor 162 during the test interval, stamping an output signal from rotational speed sensor 162 at a given instance as the overspeed trip speed responsive to receiving the output signal from trip sensor 64 at the given instance, generating a test metric by associating the stamped output signal as the overspeed trip speed with the received spring tension, and storing the test metric on at least one memory 184.

In an exemplary embodiment, the plurality of test parameters may further include a designated overspeed trip speed. In an exemplary embodiment, at least one memory 184 may further be configured to store executable instructions to urge at least one processor 182 to calculate a speed difference between the stamped output signal as the overspeed trip speed and the designated overspeed trip speed and store the speed difference on at least one memory 184.

In an exemplary embodiment, system 10 may further include an input/output (I/O) device 110 that may be coupled to control unit 18. In an exemplary embodiment, I/O device 110 may be configured to allow a user to input the plurality of test parameters into control unit 18. In an exemplary embodiment, at least one memory 184 may further be configured to store executable instructions to urge at least one processor 182 to receive the plurality of test parameters from I/O device 110. In an exemplary embodiment, I/O device 110 may further include a display. In an exemplary embodiment, at least one memory 184 may further be configured to store executable instructions to urge at least one processor 182 to display the test metrics on the display.

In an exemplary embodiment, the spring-loaded trip weight of mechanical overspeed sensing device 14 may include a spring coupled to a weight, as will be discussed. In an exemplary embodiment, the spring-loaded trip weight of mechanical overspeed sensing device 14 may further be equipped with or coupled to a spring compression adjustment mechanism 112 that may adjust the spring tension of the spring of the spring-loaded trip weight by changing an extent of compression of the spring. In an exemplary embodiment, spring compression adjustment mechanism 112 may include an adjustment screw rotatably coupled to the spring of the spring-loaded trip weight of mechanical overspeed sensing device 14. In an exemplary embodiment, the extent of compression of the spring may change responsive to rotating the adjustment screw.

In an exemplary embodiment, spring compression adjustment mechanism 112 may include a motorized adjustment screw that may be coupled to control unit 18. In an exemplary embodiment, control unit 18 may further urge the motorized adjustment screw of spring compression adjustment mechanism 112 to change the tension of the spring of the spring-loaded trip weight. In an exemplary embodiment, at least one memory 184 may further be configured to store executable instructions to urge at least one processor 182 to calibrate the threshold of overspeed trip speed by the tension of the spring of the spring-loaded trip weight of mechanical overspeed sensing device 14. In an exemplary embodiment, calibrating the threshold of overspeed trip speed by the tension of the spring may include minimizing the speed difference between the stamped output signal as the overspeed trip speed and the designated overspeed trip speed by manipulating the tension of the spring utilizing spring compression adjustment mechanism 112.

In an exemplary embodiment, spring compression adjustment mechanism 112 may include a manual adjustment screw that may be manipulated by a user. In an exemplary embodiment, to calibrate the threshold of overspeed trip speed by the tension of the spring of the spring-loaded trip weight, instead of automatically manipulating the tension of the spring utilizing control unit 18, the tension of the spring may be manipulated manually by a user.

Figure 2A:
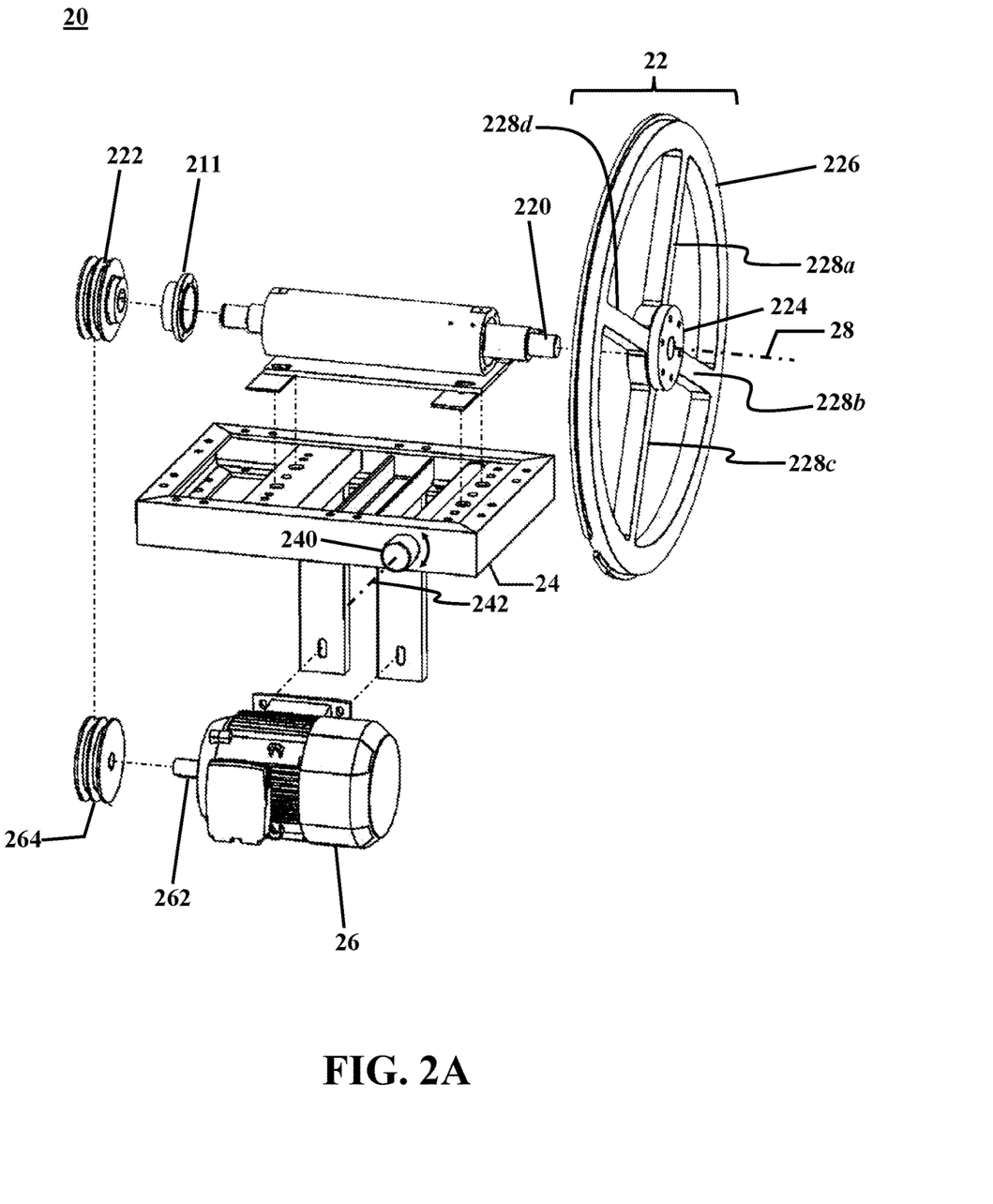
FIG. 2A illustrates a perspective view of a test apparatus for testing a mechanical overspeed sensing device, consistent with one or more exemplary embodiments of the present disclosure.
Figure 2B:
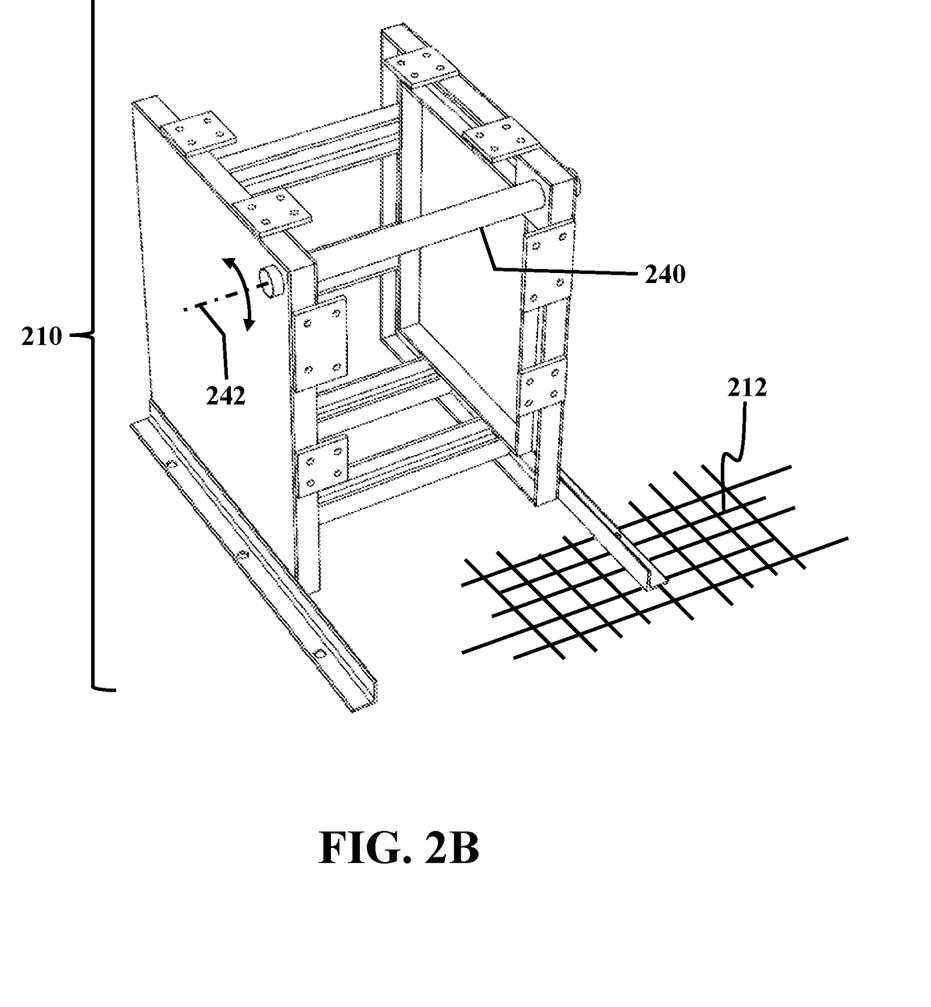
FIG. 2B illustrates a perspective view of a main chassis of a test apparatus, consistent with one or more exemplary embodiments of the present disclosure.

FIG. 2A illustrates a perspective view of a test apparatus 20 for testing a mechanical overspeed sensing device, consistent with one or more exemplary embodiments of the present disclosure. FIG. 2B illustrates a perspective view of a main chassis 210 of test apparatus 20, consistent with one or more exemplary embodiments of the present disclosure. In an exemplary embodiment, test apparatus 20 may be functionally similar to system 10 and may be configured to test a mechanical overspeed sensing device similar to mechanical overspeed sensing device 14.

In an exemplary embodiment, test apparatus 20 may include an annular support 22 similar to annular support 122 that may be rotatably mounted on a pivotable chassis 24 of test apparatus 20. In an exemplary embodiment, test apparatus 20 may further include a motor 26 similar to motor 126 that may be coupled to annular support 22 and may drive a rotational movement of annular support 22 about a central normal axis 28 of annular support 22. In an exemplary embodiment, a plane of rotation of annular support 22 may be parallel with the annular surface of annular support 22.

In an exemplary embodiment, annular support 22 may include a ring 226 that may be coaxially attached to a central hub 224 by utilizing a plurality of radial spokes (228a-228d). In an exemplary embodiment, central hub 224 may be coupled to a main shaft 220 and may be rotatable with main shaft 220. In an exemplary embodiment, main shaft 220 may be mounted on pivotable chassis 24. In an exemplary embodiment, shaft 262 of motor 26 may be coupled to main shaft 220 by utilizing a belt-and-pulley mechanism. In an exemplary embodiment, a driver pulley 264 may be rotatably coupled to shaft 262 of motor 26 and a driven pulley 222 may be coupled to main shaft 220 by utilizing a coupling member 211. In an exemplary embodiment, rotational movement of driver pulley 264 may be transferred to driven pulley 222 by utilizing a belt (not illustrated for simplicity). In an exemplary embodiment, motor 26 may alternately be coupled to annular support 22 directly or motor 26 may be coupled with main shaft 220 by utilizing other coupling mechanisms. In an exemplary embodiment, motor 26 may also be mounted on pivotable chassis 24.

In an exemplary embodiment, test apparatus 20 may further include main chassis 210 that may provide a rigid support for test apparatus 20 on a support surface 212. In an exemplary embodiment, main chassis 210 may help test apparatus to secure at position with acceptable vibrations In an exemplary embodiment, pivotable chassis 24 may be pivotally coupled to main chassis 210 by utilizing a pivot shaft 240. In an exemplary embodiment, pivot shaft 240 may provide a pivot joint between pivotable chassis 24 and main chassis 210, In an exemplary embodiment, pivotable chassis 24 may pivot about a pivot axis 242 superimposes on a longitudinal axis of pivot shaft 240 with respect to main chassis 210. In an exemplary embodiment, since annular support 22 and motor 26 are mounted on pivotable chassis 24, such configuration of pivotable chassis 24 and main chassis 210 of test apparatus 20 may allow for changing the orientation of annular support 22 between a horizontal orientation and a vertical orientation. In an exemplary embodiment, a horizontal orientation may correspond to a configuration where a plane of rotation of annular support 22 may be perpendicular to support surface 212 and a vertical orientation may correspond to a configuration where a plane of rotation of annular support 22 may be parallel with support surface 212. In an exemplary embodiment, pivotal attachment of pivotable chassis 24 to main chassis 210 utilizing pivot shaft 240 may allow for pivoting pivotable chassis 24 with respect to main chassis 210 by 90° about pivot axis 242.

Figure 3A:
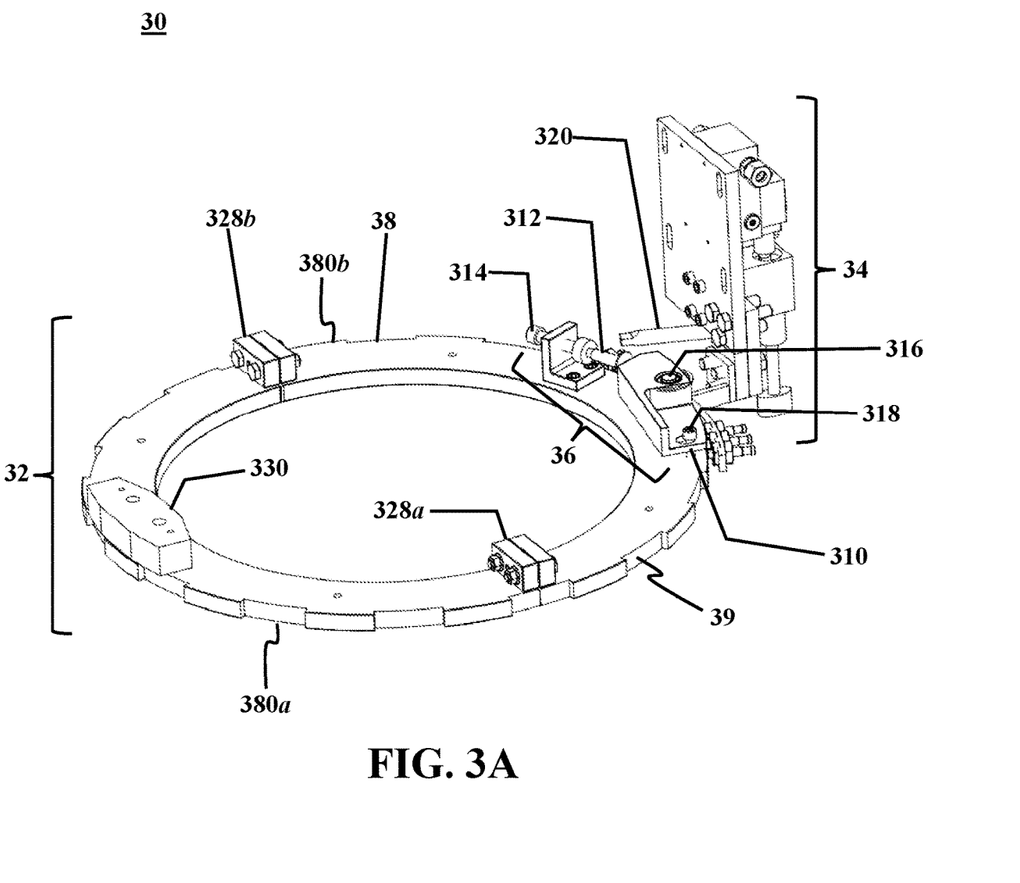
FIG. 3A illustrates a mechanical overspeed protection device, consistent with one or more exemplary embodiments of the present disclosure.
Figure 3B:
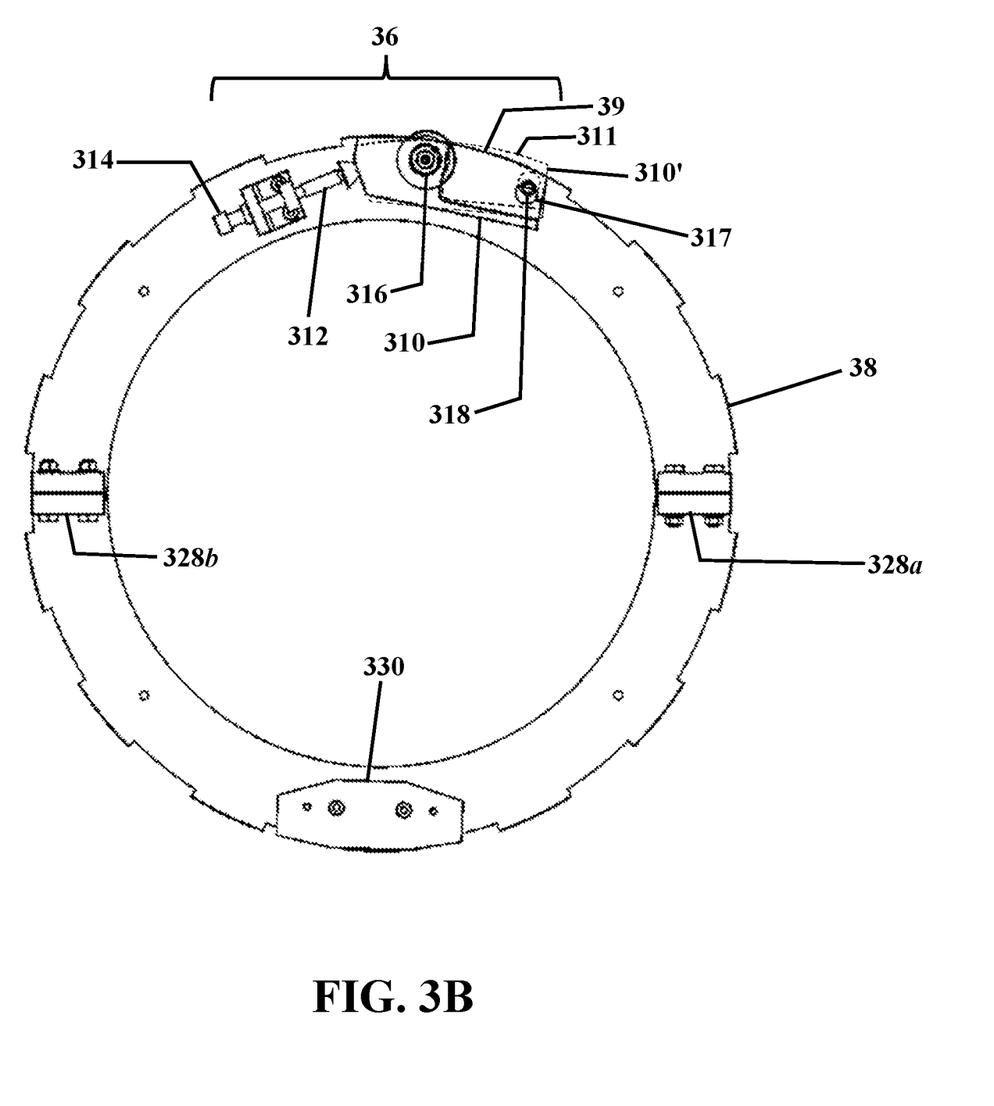
FIG. 3B illustrates a top view of a mechanical overspeed sensing device, consistent with one or more exemplary embodiments of the present disclosure.
Figure 3C:
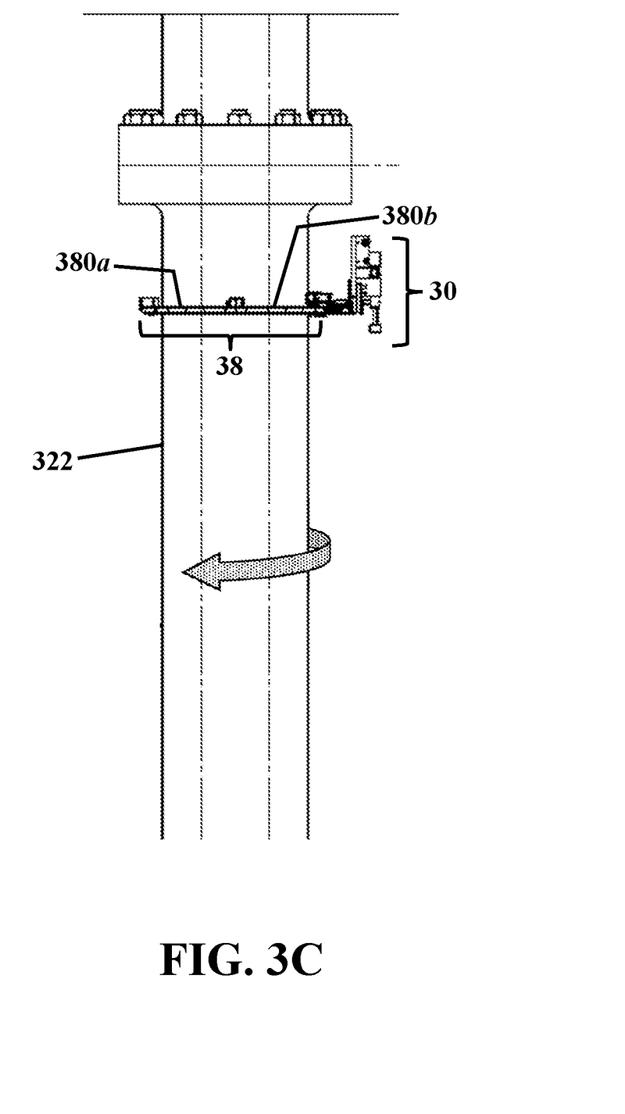
FIG. 3C illustrates a mechanical overspeed protection device mounted on a turbine shaft, consistent with one or more exemplary embodiments of the present disclosure.
Figure 3D:
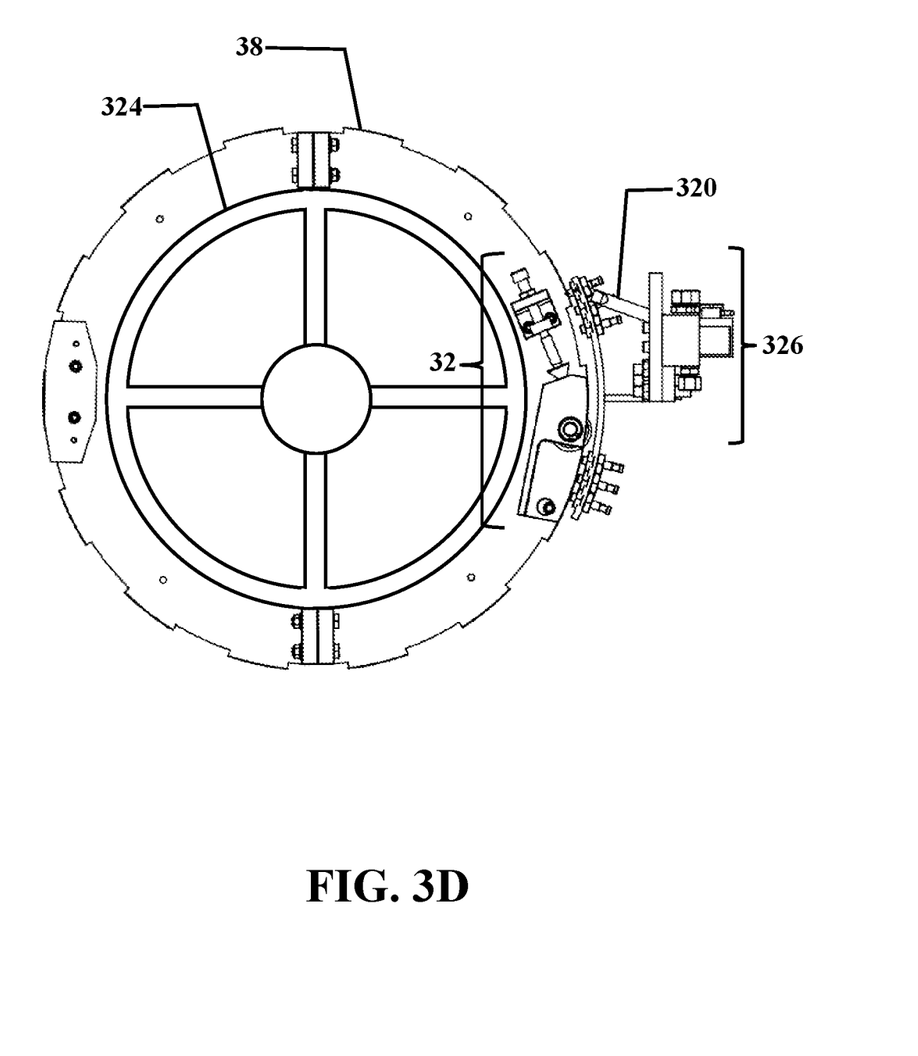
FIG. 3D illustrates a top view of a mechanical overspeed sensing device mounted on an annular support adjacent a trip sensor, consistent with one or more exemplary embodiments of the present disclosure.

FIG. 3A illustrates a mechanical overspeed protection device 30, consistent with one or more exemplary embodiments of the present disclosure. FIG. 3B illustrates a top view of a mechanical overspeed sensing device 32, consistent with one or more exemplary embodiments of the present disclosure. FIG. 3C illustrates mechanical overspeed protection device 30 mounted on a turbine shaft 322, consistent with one or more exemplary embodiments of the present disclosure. FIG. 3D illustrates a top view of mechanical overspeed sensing device 32 mounted on an annular support 324 adjacent a trip sensor 326, consistent with one or more exemplary embodiments of the present disclosure.

In an exemplary embodiment, mechanical overspeed protection device 30 may include mechanical overspeed sensing device 32 that may be coupled to a trip mechanism 34. In an exemplary embodiment, mechanical overspeed sensing device 32 may be similar to mechanical overspeed sensing device 14. In practice, an exemplary mechanical overspeed sensing device such as mechanical overspeed sensing device 32 may include a spring-loaded trip weight 36 that may be mounted on mounting ring 38. In an exemplary embodiment, mounting ring 38 may be utilized to mount spring-loaded trip weight 36 on turbine shaft 322.

In an exemplary embodiment, mounting ring 38 may include two separated half rings (380a and 380b) that may be removably connected to each other by utilizing fasteners (328a and 328b). In an exemplary embodiment, half rings (380a and 380b) of mounting ring 38 may be placed around a periphery of turbine shaft 322 and then fasteners (328a and 328b) may be utilized to fasten mounting ring 38 around turbine shaft 322. In an exemplary embodiment, mechanical overspeed sensing device 32 may be rotatable with turbine shaft 322 about a longitudinal axis of turbine shaft 322.

In an exemplary embodiment, spring-loaded trip weight 36 may include a spring 312 with an adjustable tension connected to a pivoted lever weight 310. In an exemplary embodiment, spring-loaded trip weight 36 may further include an adjustment screw 314 that may be utilized for adjusting the compression of spring 312 similar to spring compression adjustment mechanism 112. In an exemplary embodiment, pivoted lever weight 310 may be pivoted about a stud 316. In an exemplary embodiment, spring 312 may be configured to bias pivoted lever weight 310 in a direction to make pivoted lever weight 310 to pivot against centrifugal force. In an exemplary embodiment, as turbine shaft 322 spins faster, pivoted lever weight 310 may experience centrifugal inertia of motion, which may cause pivoted lever weight 310 to pivot about stud 316 against biasing of spring 312. In an exemplary embodiment, pivoted lever weight 310 may be pivotable about stud 316 between an inactive position (labeled with reference numeral 310) and a tripping position (designated by broken lines and reference numeral 310'). In an exemplary embodiment, the inactive position of pivoted lever weight 310 may correspond to a position where a tripping edge 311 of pivoted lever weight 310 may lie flush with an outer peripheral edge 39 of mounting ring 38. In an exemplary embodiment, the tripping position may correspond to a position where tripping edge 311 of pivoted lever weight 310 may at least partially extend beyond outer peripheral edge 39 of mounting ring 38. In an exemplary embodiment, at a tripping speed, centrifugal forces may cause pivoted lever weight 310 to pivot about stud 316 into the tripping position as illustrated by broken lines 316'. In other words, at a tripping speed, pivoted lever weight 310 may protrude outer peripheral edge 39 of mounting ring 38. In an exemplary embodiment, a stop pin 318 and a corresponding hole 317 on pivoted lever weight 310 may be utilized to further limit the extent of protrusion of pivoted lever weight 310.

In an exemplary embodiment, trip mechanism 34 may include a trip lever 320 that may be mounted adjacent outer peripheral edge 39 of mounting ring 38 at a radial distance from a center of mounting ring 38 equal to or less than the extent of protrusion of pivoted lever weight 310. In other words, trip lever 320 may be mounted adjacent outer peripheral edge 39 such that when mounting ring 38 rotates at tripping speed, pivoted lever weight 310 protrudes outer peripheral edge 39 of mounting ring 38 and tripping edge 311 of pivoted lever weight 310 may strike trip lever 320. In an exemplary embodiment, responsive to being struck by tripping edge 311 of pivoted lever weight 310, trip lever 320 may activate a mechanism to shut off the turbine. The shut off mechanism is not labeled or described for simplicity.

In an exemplary embodiment, since the pivoting movement of pivoted lever weight 310 is limited by utilizing spring 312, a tripping speed may be adjusted by changing the compression of spring 312 by utilizing adjustment screw 314. As used herein, the tripping speed may refer to the rotational speed of turbine shaft 322 at which mechanical overspeed sensing device 32 may be designated to recognize or detect an overspeed condition of a turbine. In an exemplary embodiment, a tripping speed may be calibrated by the extent of compression of spring 312. In an exemplary embodiment, to calibrate the tripping speed by the tension of spring 312, various tests must be carried out for different extents of compression of spring 312 to determine a specific amount of compression for spring 312 that may cause pivoted lever weight 310 to pivot outwardly and activate trip mechanism 34 at a desired rotational speed of turbine shaft 322. To this end, in an exemplary embodiment, mounting ring 38 of mechanical overspeed sensing device 32 may be utilized to mount mechanical overspeed sensing device 32 around an annular support 324 that may be similar to annular support 22.

In an exemplary embodiment, mechanical overspeed sensing device 32 may be mounted around annular support 324 of a test apparatus similar to test apparatus 20. In an exemplary embodiment, instead of trip mechanism 34 that may be configured to shut off the turbine upon actuation by mechanical overspeed sensing device 32, a trip sensor 326 may be mounted adjacent mechanical overspeed sensing device 32. In an exemplary embodiment, trip sensor 326 may be similar to trip sensor 164 and may be configured to generate an output signal responsive to trip sensor 326 being struck by spring-loaded trip weight 32 of mechanical overspeed sensing device 32.

In an exemplary embodiment, an exemplary mechanical overspeed sensing device, such as mechanical overspeed sensing device 32 may be mounted onto a test apparatus such as test apparatus 20 of a testing system such as system 10. In an exemplary embodiment, a control unit similar to control unit 18 of system 10 may be coupled to motor 26 of test apparatus 20 and trip sensor 326. In an exemplary embodiment, the control unit may be electronically coupled to a driver of motor 26 and may be configured to urge the driver to manipulate the rotational speed of an output shaft of motor 26. In an exemplary embodiment, the control unit may further be electronically coupled to a rotational speed sensor that may be coupled to main shaft 220 and trip sensor 326 and may be configured to receive the output signals generated by the rotational speed sensor and trip sensor 326. In other words, the rotational speed sensor and trip sensor 326 may include transducers that may transmit the output signals of the rotational speed sensor and trip sensor 326 to the control unit.

Figure 4:
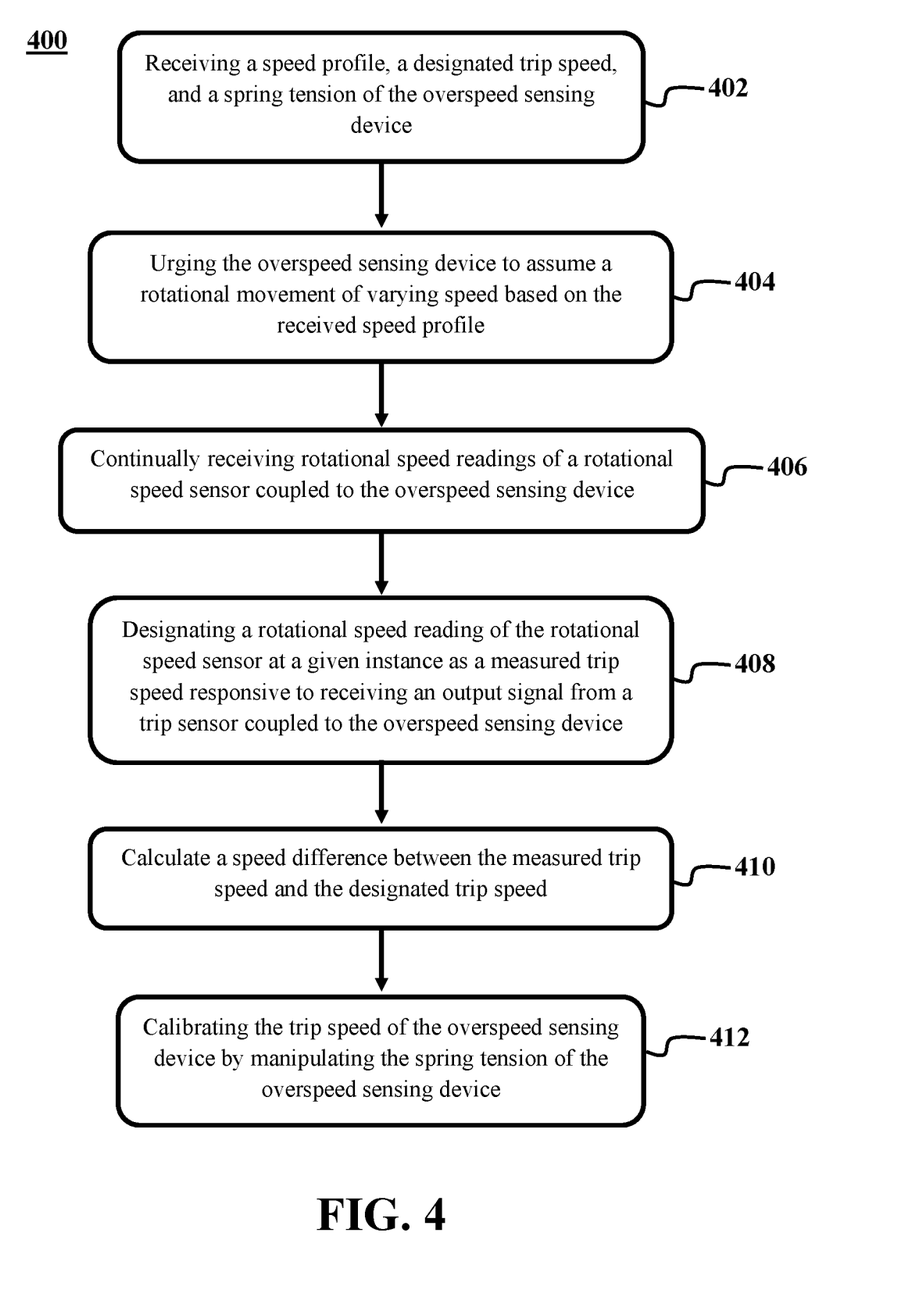
FIG. 4 illustrates a flowchart of a method for testing a mechanical overspeed sensing device, consistent with one or more exemplary embodiments of the present disclosure.

FIG. 4 illustrates a flowchart of a method 400 for testing a mechanical overspeed sensing device, consistent with one or more exemplary embodiments of the present disclosure. In an exemplary embodiment, control unit 18 of system 10 may be configured to implement method 400 for testing an overspeed sensing device similar to overspeed sensing device 14.

In an exemplary embodiment, method 400 may include a step 402 of receiving a speed profile, a designated trip speed, and a spring tension of the overspeed sensing device, a step 404 of urging the overspeed sensing device to assume a rotational movement of varying speed based on the received speed profile, a step 406 of continually receiving rotational speed readings of a rotational speed sensor coupled to the overspeed sensing device, a step 408 of designating a rotational speed reading of the rotational speed sensor at a given instance as a measured trip speed responsive to receiving an output signal from a trip sensor coupled to the overspeed sensing device, a step 410 of calculate a speed difference between the measured trip speed and the designated trip speed, and a step 412 of calibrating the trip speed of the overspeed sensing device by manipulating the spring tension of the overspeed sensing device, where calibrating includes repeating steps 402 to 410 for an overspeed sensing device with various spring tensions and finding a spring tension for which the calculated speed difference is the minimum.

In an exemplary embodiment, step 402 of receiving a speed over time graph, a designated trip speed, and a spring tension of the overspeed sensing device may involve receiving a speed over time graph, a designated trip speed, and a spring tension of the overspeed sensing device form a user by utilizing I/O device 110. In practice, a user may adjust a spring tension of overspeed sensing device 14 by utilizing spring compression adjustment mechanism 112 and then input the adjusted value of spring compression as the spring tension of overspeed sensing device 14 into control unit 18 by utilizing I/O device 110. In other words, step 402 may involve receiving the adjusted spring tension for overspeed sensing device 14 form a user. In an exemplary embodiment, the designated trip speed may refer to a speed threshold designated by a user, at and above which overspeed sensing device 14 is to be activated. In an exemplary embodiment, step 402 may involve receiving the designated trip speed from a user by utilizing I/O device 110. In an exemplary embodiment, a speed profile may refer to a speed data that shows how a rotational speed of overspeed sensing device 14 is to be changed during a test interval from zero to a maximum allowable rotational speed under the test conditions. In an exemplary embodiment, step 402 may involve receiving the speed profile as a speed over time graph, data, or relation from a user by utilizing I/O device 110.

In an exemplary embodiment, step 404 of urging the overspeed sensing device to assume a rotational movement of varying speed based on the received speed profile may involve urging motor 126 to drive a rotational motion of annular support 122 based on the received speed profile, which in turn causes overspeed sensing device 14 mounted on annular support 122 to assume the same rotational movement of varying speed based on the received speed profile. In practice, motor 126 may follow the received speed profile and may start from zero rpm and then may gradually speed up to the maximum allowable rpm under the test conditions.

In an exemplary embodiment, step 406 of continually receiving rotational speed readings of a rotational speed sensor coupled to the overspeed sensing device may involve continually receiving output signals of rotational speed sensor 162 that may be coupled to annular support 122. In other words, the rotational speed of annular support 122 may be constantly monitored during the test interval as motor 126 is urging annular support 122 to speed up from zero rpm to the maximum allowable rpm.

In an exemplary embodiment, step 408 may involve designating a rotational speed reading of rotational speed sensor 162 at a given instance as a measured trip speed responsive to receiving an output signal from trip sensor 164 coupled to overspeed sensing device 14 at that rotational speed. As discussed earlier in this disclosure, overspeed sensing device 14 is configured to be activated when the rotational speed of annular support 122 exceeds a predetermined threshold and such threshold may be determined based on the spring tension of overspeed sensing device 14. In an exemplary embodiment, overspeed sensing device 14 being activated may refer to overspeed sensing device 14 striking or triggering trip sensor 164. Consequently, receiving an output signal from trip sensor 164 may indicate the occurrence of overspeed and the rotational speed at which the overspeed happens may be designated as the measured trip speed. In an exemplary embodiment, in step 410 a speed difference between the measured trip speed and the designated trip speed received form a user may be calculated for the given spring tension.

In an exemplary embodiment, step 412 of calibrating the trip speed of the overspeed sensing device may include manipulating the spring tension of overspeed sensing device 14. In an exemplary embodiment, manipulating the spring tension of overspeed sensing device 14 may refer to changing the spring tension of overspeed sensing device 14 and then repeating steps 402 to 410 for overspeed sensing device 14 for each spring tension value. In an exemplary embodiment, calibration may be performed by finding a spring tension of overspeed sensing device 14 for which the calculated speed difference is the minimum. In practice, a user may utilize spring compression adjustment mechanism 112 to adjust the spring tension of overspeed sensing device 14 at a certain value and then may perform steps 402 to 410 utilizing system 10 to obtain a measured trip speed for that certain spring tension of overspeed sensing device 14. Then, the user may change the spring tension of overspeed sensing device 14 to another value and then may perform steps 402 to 410 utilizing system 10 to obtain another measured trip speed for that spring tension. This way, by repeating steps 402 to 410 for various spring tensions, a plurality of measured trip speeds may be obtained for a corresponding plurality of spring tension values. Here, a spring tension value that corresponds to a measured trip speed closest to the designated trip speed may be designated as the calibrated spring tension.

Figure 5:
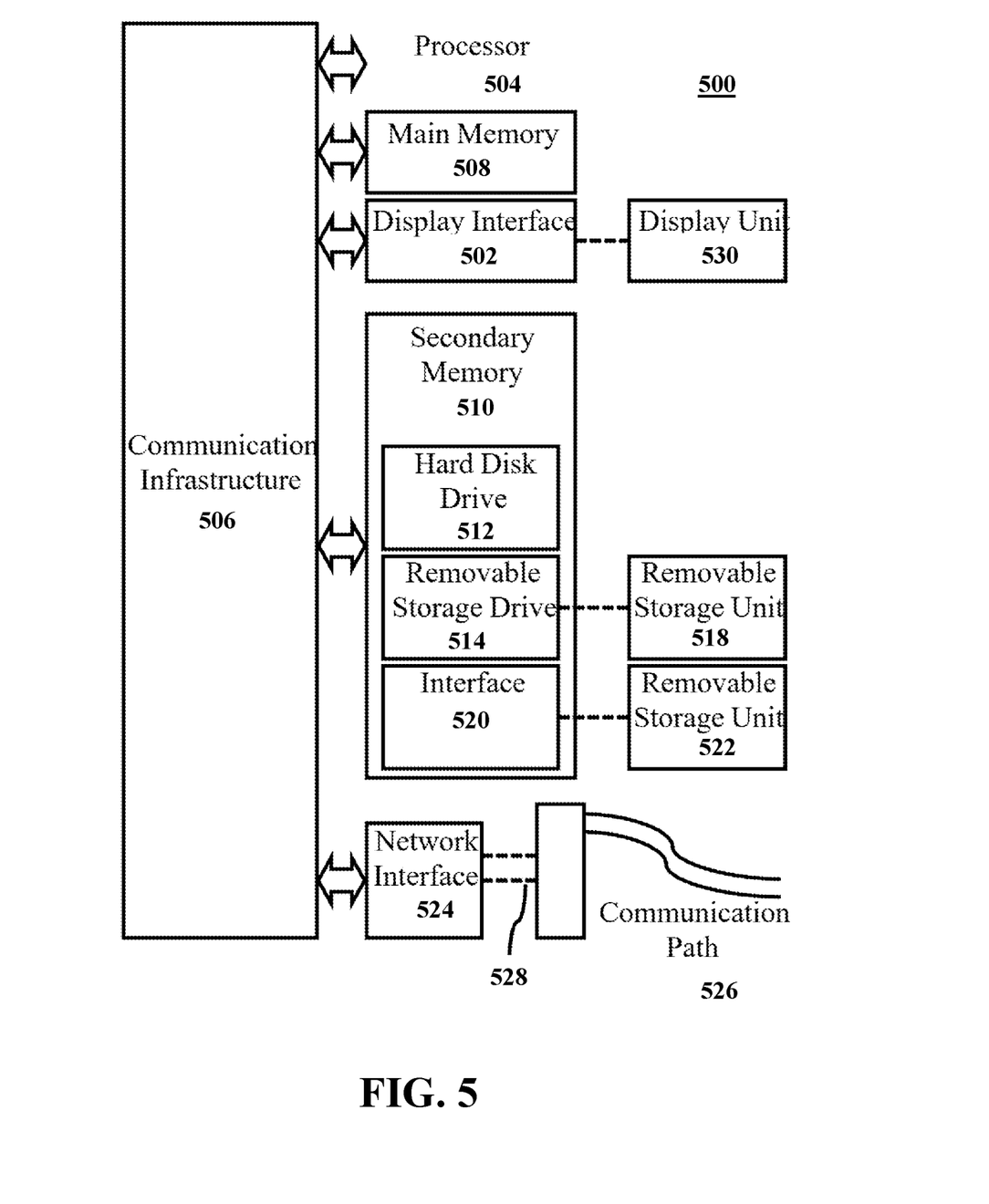
FIG. 5 illustrates a high-level functional block diagram of a computer system, consistent with one or more exemplary embodiments of the present disclosure.

FIG. 5 illustrates a high-level functional block diagram of a computer system 500, in which an embodiment of the present invention, or portions thereof, may be implemented as computer-readable code, consistent with exemplary embodiments of the present disclosure. For example, control unit 18 may be implemented in computer system 500 using hardware, software, firmware, tangible computer-readable media having instructions stored thereon, or a combination thereof and may be implemented in one or more computer systems or other processing systems.

If programmable logic is used, such logic may execute on a commercially available processing platform or a special purpose device. One ordinary skill in the art may appreciate that an embodiment of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

An embodiment of the invention is described in terms of this example computer system 500. After reading this description, it will become apparent to a person skilled in the relevant art how to implement the invention using other computer systems and/or computer architectures. Although operations may be described as a sequential process, some of the operations may be performed in parallel, concurrently, and/or in a distributed environment, and with program code stored locally or remotely for access by single or multi-processor machines. Also, in some embodiments, the order of operations may be rearranged without departing from the spirit of the disclosed subject matter.

Processor device 504 may be similar to processor 182 and may be a special purpose or a general-purpose processor device. As will be appreciated by persons skilled in the relevant art, processor device 504 may also be a single processor in a multi-core/multiprocessor system, such system operating alone, or in a cluster of computing devices operating in a cluster or server farm. Processor device 504 may be connected to a communication infrastructure 506, for example, a bus, message queue, network, or multi-core message-passing scheme.

In an exemplary embodiment, computer system 500 may include a display interface 502, for example, a video connector, to transfer data to a display unit 530, for example, a monitor, which may be a part of an I/O device such as I/O device 110. Computer system 500 may also include a main memory 508 similar to memory 184, for example, random access memory (RAM), and may also include a secondary memory 510. Secondary memory 510 may include, for example, a hard disk drive 512, and a removable storage drive 514. Removable storage drive 514 may include a floppy disk drive, a magnetic tape drive, an optical disk drive, a flash memory, or the like. Removable storage drive 514 may read from and/or write to a removable storage unit 518 in a well-known manner. Removable storage unit 518 may include a floppy disk, a magnetic tape, an optical disk, etc., which may be read by and written to by removable storage drive 514. As will be appreciated by persons skilled in the relevant art, removable storage unit 518 may include a computer-usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot, and card, or the like. Software and data transferred via communications interface 524 may be in the form of signals, which may be electronic, electromagnetic, optical, or other signals capable of being received by communications interface 524. These signals may be provided to communications interface 524 via a communications path 526. Communications path 526 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 518, removable storage unit 522, and a hard disk installed in hard disk drive 512. Computer program medium and computer-usable medium may also refer to memories, such as main memory 508 and secondary memory 510, which may be memory semiconductors (e.g. DRAMs, etc.).

Computer programs (also called computer control logic) are stored in main memory 508 and/or secondary memory 510. Computer programs may also be received via communications interface 524. Such computer programs, when executed, enable computer system 500 to implement different embodiments of the present disclosure as discussed herein. In particular, the computer programs, when executed, enable processor device 504 to implement the processes of the present disclosure, such as the operations in method 400. Accordingly, such computer programs represent controllers of computer system 500. Where an exemplary embodiment of control unit 18 is implemented using software, the software may be stored in a computer program product and loaded into computer system 500 using removable storage drive 514, interface 520, and hard disk drive 512, or communications interface 524.

Embodiments of the present disclosure also may be directed to computer program products including software stored on any computer useable medium. Such software, when executed in one or more data processing devices, causes a data processing device to operate as described herein. An embodiment of the present disclosure may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps. Moreover, the word "substantially" when used with an adjective or adverb is intended to enhance the scope of the particular characteristic, e.g., substantially planar is intended to mean planar, nearly planar and/or exhibiting characteristics associated with a planar element. Further use of relative terms such as "vertical", "horizontal", "up", "down", and "side-to-side" are used in a relative sense to the normal orientation of the apparatus.

What is claimed is:

1. A system for testing a mechanical overspeed sensing device, the system comprising:
    a main chassis;
    an annular support mounted on the main chassis, the annular support configured to allow for the mechanical overspeed sensing device to be mounted on the annular support, the mechanical overspeed sensing device comprising a spring-loaded trip weight with a predetermined spring tension;
    a motor coupled to the annular support, the motor configured to drive a rotational movement of the annular support;
    a rotational speed sensor coupled to the annular support, the rotational speed sensor configured to generate output signals indicative of rotational speed of the annular support at any given instance during a test interval;
    a trip sensor coupled to the mechanical overspeed sensing device, the trip sensor configured to generate an output signal responsive to the trip sensor being struck by the spring-loaded trip weight;
    a control unit coupled to the motor, the rotational speed sensor, and the trip sensor, the control unit comprising:
        at least one processor;
        at least one non-transitory memory coupled to the at least one processor, the at least one non-transitory memory configured to store executable instructions to urge the at least one processor to:
            receive a plurality of test parameters, the plurality of test parameters comprising the spring tension for the spring-loaded trip weight and a speed-over-time data;
            urge the motor to drive the rotational movement of the annular support based on the received speed-over-time data during the test interval;
            continually receive the output signals from the rotational speed sensor during the test interval;
            designating an output signal from the rotational speed sensor at a given instance as a measured trip speed responsive to receiving the output signal from the trip sensor at the given instance; and
            generate a test metric by associating the measured trip speed with the received spring tension.

2. The system according to claim 1, wherein the plurality of test parameters further comprise a designated trip speed, the at least one non-transitory memory further configured to store executable instructions to urge the at least one processor to calculate a speed difference between the measured trip speed and the designated trip speed.

3. The system according to claim 2, further comprising an input/output (I/O) device, the I/O device coupled to the control unit, the I/O device configured to allow a user to input the plurality of test parameters into the control unit, the at least one non-transitory memory further configured to store executable instructions to urge the at least one processor to receive the plurality of test parameters from the I/O device.

4. The system according to claim 3, wherein the I/O device comprises a display, the at least one non-transitory memory further configured to store executable instructions to urge the at least one processor to display the test metrics on the display.

5. The system according to claim 2, wherein the spring-loaded trip weight comprises a spring coupled to a weight, wherein the system further comprise an adjustment mechanism coupled to the spring, the adjustment mechanism configured to adjust the spring tension of the spring by changing an extent of compression of the spring.

6. The system according to claim 5, wherein the adjustment mechanism comprises a rotatable screw coupled to the spring, wherein the extent of compression of the spring changes responsive to rotating the rotatable screw.

7. The system according to claim 6, wherein the annular support is pivotally mounted to the main chassis utilizing a main pivot joint, the main pivot joint configured to allow the annular support to pivot about a main pivot axis relative to the main chassis.

8. The system according to claim 7, wherein the annular support is rotatable about a central normal axis of the annular support, the central normal axis comprising an axis perpendicular to the largest surface of the annular support.

9. The system according to claim 8, wherein the main pivot axis is perpendicular to the central normal axis of the annular support.

10. The system according to claim 9, wherein the spring-loaded trip weight comprises:
    a mounting ring;
    a spring attached to the mounting ring from a first end of the spring; and
    a pivoted trip weight pivotally mounted on the mounting ring utilizing a stud, wherein, the annular support is configured to allow for the mounting ring to be mounted on a peripheral edge of the annular support, a plane of rotation of the mounting ring superimposed on the plane of rotation of the annular support.

11. The system according to claim 10, wherein the trip sensor comprises a proximity sensor coupled to a trip lever, the trip sensor configured to generate an output signal responsive to the movement of the trip lever, the trip lever mounted near the peripheral edge of the annular support.

12. A method for testing a mechanical overspeed sensing device, the method comprising:

receiving a speed-over-time data, a designated trip speed, and a spring tension of the mechanical overspeed sensing device;

urging the overspeed sensing device to assume a rotational movement of varying speed based on the receive speed-over-time data utilizing a test apparatus, the test apparatus comprising:

a main chassis;

an annular support mounted on the main chassis, the annular support configured to allow for the mechanical overspeed sensing device to be mounted on the annular support, the mechanical overspeed sensing device comprising a spring-loaded trip weight with a predetermined spring tension;

a motor coupled to the annular support, the motor configured to drive a rotational movement of the annular support;

a rotational speed sensor coupled to the annular support, the rotational speed sensor configured to generate output signals indicative of rotational speed of the annular support at any given instance during a test interval;

a trip sensor coupled to the mechanical overspeed sensing device, the trip sensor configured to generate an output signal responsive to the trip sensor being struck by the spring-loaded trip weight, wherein, urging the overspeed sensing device to assume a rotational movement of varying speed based on the receive speed-over-time data comprises urging the motor to drive a rotational movement of the annular support with a varying speed based on the receive speed-over-time data;

continually receiving rotational speed readings of the rotational speed sensor;

designating a rotational speed reading of the rotational speed sensor at a given instance as a measured trip speed responsive to receiving an output signal from the trip sensor;

calculate a speed difference between the measured trip speed and the designated trip speed; and calibrating the trip speed of the overspeed sensing device by manipulating the spring tension of the overspeed sensing device.

\* \* \* \* \*